July 1, 1969  H. G. DAVIES  3,452,795
APPARATUS FOR SLICING AND COMMINUTING FOOD PRODUCTS
Filed July 7, 1967

INVENTOR
HARVEY G. DAVIES
BY: W. Britton Moore
ATTORNEY

United States Patent Office 3,452,795
Patented July 1, 1969

3,452,795
APPARATUS FOR SLICING AND COMMINUTING FOOD PRODUCTS
Harvey G. Davies, 67 Bannockburn Ave., Toronto 12, Ontario, Canada
Filed July 7, 1967, Ser. No. 651,900
Int. Cl. A01d 55/06; B26d 7/16
U.S. Cl. 146—150                     5 Claims

ABSTRACT OF THE DISCLOSURE

Two boxes each open at one end only adapted to slidably fit one within the other with their closed ends opposed, one constituting a container for the product to be cut and having two of its opposed walls provided with aligned, evenly spaced knife grooves from its open end downwards and having its two other vertical walls similarly grooved and spaced, and the other box having two of its opposed vertical walls closed and its other two opposed vertical walls and the closed end wall thereof having knife grooves continuous throughout their said end and side walls spaced correspondingly to and alignable with the grooves of two opposed sides only of said container in one interfitting relationship of the two said boxes and in another circumferential interfitting relationship of said two boxes providing aligned relationship of the knife grooves of the two boxes at right angles to the first mentioned relationship.

---

The invention relates to improvements in apparatus for slicing and comminuting food products.

Previously known apparatus used to slice bread, vegetables or other like products have usually taken the form of grooved wooden blocks or a single grooved, or slotted, box. The disadvantages of the wooden block type lie in the fact that they can only be used to slice materials.

Other devices for comminuting food products have mostly been complicated in structure, complex in operation, and expensive to produce.

The primary object of the present invention is to provide comminuting apparatus of simple construction, efficient in operation and inexpensive to produce.

Another object of the invention is to reduce to a minimum the handling of the product during the slicing and/or cubing operations.

A further object of the invention is to provide apparatus for the purpose described which may be easily cleaned and sterilized.

With the above and other objects in view, the invention consists in the novel features of construction, arrangements and combinations of parts described and shown herein and more particularly pointed out in the claims for novelty following.

Figure 1:
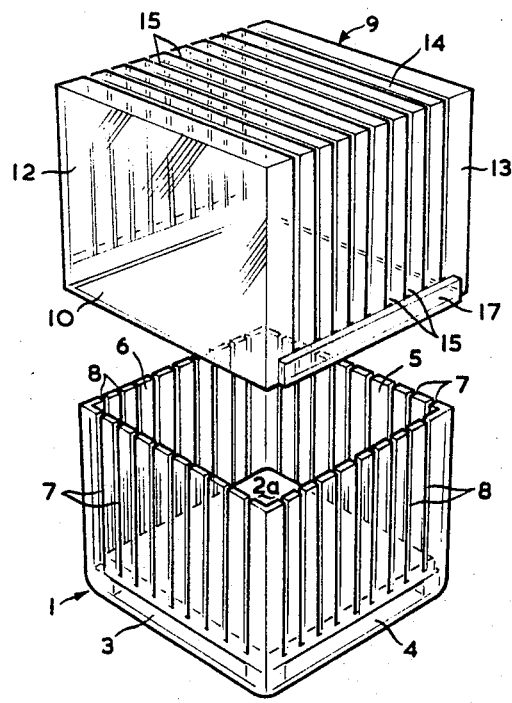
Figure 2:
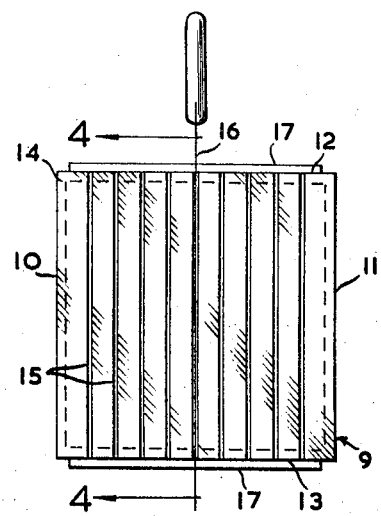
Figure 3:
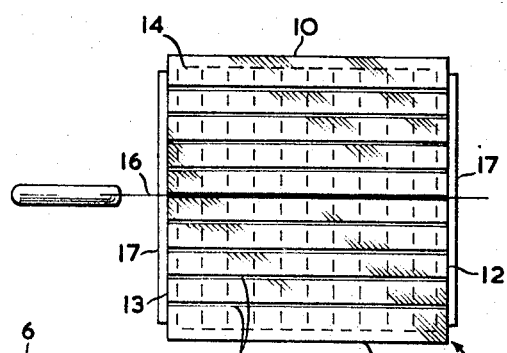
Figure 4:
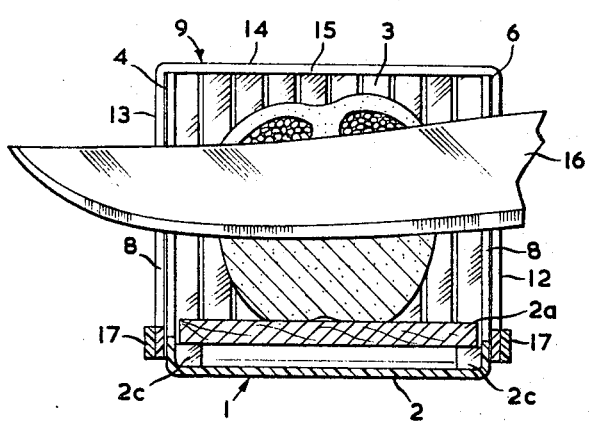

In describing the invention reference will be made to the accompanying drawings in which:

FIGURE 1 is an exploded view in perspective of the cooperating boxes employed in the comminuting and slicing operations, FIGURE 2 is a plan view of the boxes assembled with the knife receiving grooves or cuts coinciding in one assembled condition of the devices as for slicing or cutting the contents of the container in one direction, FIGURE 3 is a plan view of the two boxes arranged with the cutting knife grooves oppositely arranged to cut the material in a direction at right angles to the cuts accomplished with the arrangement shown in FIGURE 2, FIGURE 4 is a sectional view through the two boxes shown in FIGURE 2, showing a cutting knife-blade in process of slicing a tomato.

Like numerals of reference denote like parts in the various figures.

Referring to the drawings, 1 denotes generally the lower box, which is of square cross section and is preferably made of clear plastic and constitutes the container for the material to be cut. The box 1 is open at its top and has a closed bottom 2 above which is preferably laid a wooden base board 2a on suitable spacing blocks 2c.

The box 1 has four perpendicular sides 3, 4, 5, and 6. Two opposing sides 3 and 5 are provided with vertical, horizontally aligned, slots 7 which enter the top edges of the walls of the box and terminate short of the bottom, preferably substantially even with the top surface of the base board 2a. The opposed sides 4 and 6 of the box are provided with opposed slots 8, which are spaced in accordance with the spacing of the slots 7 and are aligned with one another.

It will thus be noted that the aligned slots 7 in the two opposed sides 3 and 5 provide knife guides in one direction and the aligned slots 8 in the opposite sides 4 and 6 provide knife guides at right angles to the direction afforded by the guide slots 7.

The upper box-like device 9 is also of square cross-section and is of sufficiently larger transverse area than the lower box 1 to provide a sliding fit over said lower box 1, the said box 9 being inverted with respect to the box 1 when the apparatus is in use.

The box 9 has its opposed sides 10 and 11 closed and has its other opposite sides 12 and 13 and its top 14 provided with endwise registering knife slots 15, spaced horizontally in correspondence with the spacing of the knife slots in the box 1, so that a knife blade 16 is placed in a slot 15 in the top of the box 9 and pressed downwards will extend downwards through the registering vertical slots in the two boxes as far as the top surface of the base board 2a.

The knife slots 15 in the walls of the upper box 9 are of sufficient length that in the fully integrated relationship of the boxes the said slots will terminate on a lower plane than the top surface of the base board 2a and the uncut portions of the walls beyond the slots will serve to strengthen the walls along their outer edges. If desired, further reinforcing means 17, either in the form of strips secured along the outer sides below the slots, as shown, or by increasing the thickness of the walls beyond the slots in the event that the box 9 is of moulded construction.

When the upper box 9 is placed over the box 1 in such relation that the knife slots 15 are in register with the slots 8 in the box, the assembled boxes will lie as shown in FIGURES 2 and 4, so that the cuts made by the knife will slice in one direction and when the upper box 9 is raised and turned in relation to the lower box 1 a quarter turn and replaced on the box 1, the cuts 15 will lie in register with the cuts 7, so that the material in the lower box or container 1 will be cut at right angles to the previous cuts. Thus slicing the material or cutting same into cubes can be quickly and efficiently accomplished, particularly when the knife used is of the electrically operated type.

From the foregoing, the construction and operation of the invention will be readily understood and further explanation is believed to be unnecessary. However, while there has been shown and described herein the presently preferred form of construction and arrangement of parts for carrying out the said invention, this is capable of variation and modification within the scope of the appended claims.

What I claim as my invention is:
1. Apparatus for slicing and comminuting food products, comprising, in combination, a lower open-topped box constituting a container for material to be cut, an upper open-ended box receiving the open end of said lower box in its open end and slidable thereover, a cutter, said boxes having slots cooperating in selective alternate integrated relationship of said boxes to provide means to guide said cutter in selected cutting directions, said lower box having a closed bottom and four side walls rising vertically from said bottom, each of said side walls having a like number of vertical cutters slots therein in equispaced relation, the cutter slots in to opposed sides being horizontally aligned and the said cutter slots of the other two opposed side walls being horizontally aligned in a direction at right angles to said first two opposed side walls, said upper box having a closed end opposing said closed end of said lower box in the integrated relationship of said boxes, said upper box having four vertical sides of which two opposed ones are closed and the other two opposed sides are provided with cutter slots equispaced with respect to the cutter slots in said lower box, said closed end of said upper box having vertical cutter slots therein in parallel with said closed sides of said upper box, corresponding in number to and registering at their ends with the respective vertical cutter slots in the sides of said upper box, whereby said cutter when forced downwards in one of said cross slots will pass downwardly through the vertically aligned slots in the opposed sides of said boxes into cutting engagement with the product, and means for reversing the direction of cut through the product comprising the step of removing the upper box from engagement with the lower box, moving same rotationally one quarter turn with respect to said lower box and replacing same over said lower box.

2. Apparatus for slicing and comminuting food products, as defined in claim 1, in which said upper and lower boxes are of square shape in plan and wherein the said upper box is of sufficiently greater cross sectional area than said lower box to slidably fit over said lower box.

3. Apparatus for slicing and comminuting food products, as defined in claim 1, characterised by a base board positioned within said lower box in upwardly spaced relation to the bottom of said box.

4. Apparatus for slicing and comminuting food products, as claimed in claim 2, characterised in that the vertical cutter slots in said lower box extend downwards below the top surface of said base board.

5. Apparatus for slicing and comminuting food products, as defined in claim 1, characterised by bracing means extending along the sides of said upper box beyond the ends of said cutter slots.

References Cited

UNITED STATES PATENTS

| 920,345 | 5/1909 | Kolodziej | 146—150 X |
| 3,318,352 | 5/1967 | Seltzer | 146—150 |

W. GRAYDON ABERCROMBIE, *Primary Examiner.*

U.S. Cl. X.R.

146—81